US011361571B1

(12) United States Patent
Fusco et al.

(10) Patent No.: US 11,361,571 B1
(45) Date of Patent: Jun. 14, 2022

(54) TERM EXTRACTION IN HIGHLY TECHNICAL DOMAINS

(71) Applicant: International Business Machines Corporation, Armonk, NY (US)

(72) Inventors: Francesco Fusco, Zurich (CH); Peter Willem Jan Staar, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/361,307

(22) Filed: Jun. 28, 2021

(51) Int. Cl.
| | |
|---|---|
| *G06V 30/414* | (2022.01) |
| *G06F 40/166* | (2020.01) |
| *G06N 3/08* | (2006.01) |
| *G06F 40/279* | (2020.01) |
| *G06F 40/268* | (2020.01) |

(52) U.S. Cl.
CPC .......... *G06V 30/414* (2022.01); *G06F 40/166* (2020.01); *G06F 40/268* (2020.01); *G06F 40/279* (2020.01); *G06N 3/08* (2013.01)

(58) Field of Classification Search
None
See application file for complete search history.

(56) References Cited

U.S. PATENT DOCUMENTS

| | | | |
|---|---|---|---|
| 8,370,319 B1 | 2/2013 | Krynski | |
| 9,460,078 B2 * | 10/2016 | Dwarakanath | ........ G06F 40/242 |
| 10,002,188 B2 * | 6/2018 | Misra | ..................... G06F 16/345 |
| 2005/0278325 A1 | 12/2005 | Mihalcea | |
| 2013/0086509 A1 | 4/2013 | Satyanarayana | |
| 2014/0164399 A1 * | 6/2014 | Mandelstein | ........... G06F 16/16 |
| | | | 707/749 |

(Continued)

FOREIGN PATENT DOCUMENTS

CN       111651986 A    9/2020

OTHER PUBLICATIONS

Wang, Li, Wei Zhu, Sihang Jiang, Sheng Zhang, Keqiang Wang, Yuan Ni, Guotong Xie, and Yanghua Xiao. "Mining infrequent high-quality phrases from domain-specific corpora." In Proceedings of the 29th ACM International Conference on Information & Knowledge Management, pp. 1535-1544. 2020. (Year: 2020).*

(Continued)

*Primary Examiner* — Frank D Mills
(74) *Attorney, Agent, or Firm* — Brian Welle

(57) ABSTRACT

A language model is fine-tuned by extracting terminology terms from a text document. The method comprises identifying a text snippet, identifying candidate multi-word expressions using part of speech tags, and determining a specificity score value for each of the candidate multi-word expressions. Moreover, the method comprises determining a topic similarity score value for each of the candidate multi-word expressions, selecting remaining expressions from the candidate multi-word expressions using a function of a specificity value and a topic similarity value of each of the candidate multi-word expressions, adding a noun comprised in the text snippet to the remaining expressions depending on a correlation function, labeling the remaining multi-word expressions, and fine-tuning an existing pre-trained transformer-based language model using as training data the identified text snippet marked with the labeled remaining expressions.

20 Claims, 9 Drawing Sheets

(56) References Cited

U.S. PATENT DOCUMENTS

| | | | | |
|---|---|---|---|---|
| 2020/0125800 | A1* | 4/2020 | Jeffs | G06F 40/279 |
| 2020/0342168 | A1* | 10/2020 | He | G06N 3/08 |
| 2021/0294974 | A1* | 9/2021 | Gao | G06F 40/166 |

OTHER PUBLICATIONS

Anonymous, "A Method for extracting Entity-Action Relationships and other related Attributes from Technical Documents," IP.com, Disclosure No. IPCOM000261134D, Feb. 2, 2020, 6 pages, <https://priorart.ip.com/IPCOM/000261134>.

Bennani-Smires et al., "Simple Unsupervised Keyphrase Extraction using Sentence Embeddings," Proceedings of the 22nd Conference on Computational Natural Language Learning (CoNLL 2018), Oct. 31-Nov. 1, 2018, pp. 221-229. <https://www.aclweb.org/anthology/K18-1022/>.

Caraballo et al., "Determining the specificity of nouns from text," 1999 Joint SIGDAT Conference on Empirical Methods in Natural Language Processing and Very Large Corpora, 1999, pp. 63-70. <https://www.aclweb.org/anthology/W99-0609/>.

Devlin et al., "BERT: Pre-training of Deep Bidirectional Transformers for Language Understanding," Proceedings of NAACL-HLT 2019, Jun. 2-7, 2019, pp. 4171-4186. <https://www.aclweb.org/anthology/N19-1423.pdf>.

Florescu et al., "PositionRank: An Unsupervised Approach to Keyphrase Extraction from Scholarly Documents," Proceedings of the 55th Annual Meeting of the Association for Computational Linguistics, Jul. 30-Aug. 4, 2017, pp. 1105-1115. <https://www.aclweb.org/anthology/P17-1102/>.

Hasan et al., "Automatic Keyphrase Extraction: A Survey of the State of the Art," Proceedings of the 52nd Annual Meeting of the Association for Computational Linguistics, Jun. 23-25, 2014, pp. 1262-1273. <https://www.aclweb.org/anthology/P14-1119/>.

Kudo, "Subword Regularization: Improving Neural Network Translation Models with Multiple Subword Candidates," Proceedings of the 56th Annual Meeting of the Association for Computational Linguistics (Long Papers), Jul. 15-20, 2018, pp. 66-75. <https://www.aclweb.org/anthology/P18-1007/>.

Le et al., "Unsupervised Keyphrase Extraction: Introducing New Kinds of Words to Keyphrases," Australasian Joint Conference on Artificial Intelligence, Dec. 2016, 6 pages. <https://www.researchgate.net/publication/311098333_>.

Mahata et al., "Key2Vec: Automatic Ranked Keyphrase Extraction from Scientific Articles using Phrase Embeddings," Proceedings of NAACL-HLT 2018, Jun. 1-6, 2018, pp. 634-639. <https://www.aclweb.org/anthology/N18-2100/>.

Oliver et al., "TBXTools: A Free, Fast and Flexible Tool for Automatic Terminology Extraction," Proceedings of Recent Advances in Natural Language Processing, Sep. 7-9, 2015, pp. 473-479. <https://www.aclweb.org/anthology/R15-1062/>.

Papagiannopoulou et al., "A Review of Keyphrase Extraction," arXiv:1905.05044v2 [cs.CL], Jul. 30, 2019, 59 pages, <https://arxiv.org/abs/1905.05044>.

Radford et al., "Language models are unsupervised multitask learners," 2019, 24 pages. <https://d4mucfpksywv.cloudfront.net/better-language-models/language_models_are_unsupervised_multitask_learners.pdf>.

Ryu et al., "Taxonomy Learning using Term Specificity and Similarity," Proceedings of the 2nd Workshop on Ontology Learning and Population, Jul. 2006, pp. 41-48. <https://www.aclweb.org/anthology/W06-0506/>.

Sajatovic et al., "Evaluating Automatic Term Extraction Methods on Individual Documents," Proceedings of the Joint Workshop on Multiword Expressions and WordNet (MWE-WN 2019), Aug. 2, 2019, pp. 149-154. <https://www.aclweb.org/anthology/W19-5118/>.

Schuster et al., "Japanese and Korean Voice Search," 2012 IEEE International Conference on Acoustics, Speech and Signal Processing (ICASSP), Aug. 31, 2021, pp. 5149-5152. <https://research.google.com/pubs/archive/37842.pdf>.

Sennrich et al., "Neural Machine Translation of Rare Words with Subword Units," Proceedings of the 54th Annual Meeting of the Association for Computational Linguistics, Aug. 7-12, 2016, pp. 1715-1725. <https://www.aclweb.org/anthology/P16-1162/>.

Simon, "Automatic Term Extraction in Technical Domain Using Part-of-Speech and Common-Word Features," Dalhousie University, May 2018, 84 pages. <https://dalspace.library.dal.ca/bitstream/handle/10222/74093/Simon_Nisha_MCs_CSCI_May_2018.pdf?sequence=3&isAllowed=y>.

Staar et al., "Corpus Processing Service: A Knowledge Graph Platform to perform deep data exploration on corpora," Applied AI Letters, Dec. 16, 2020, 15 pages. <https://onlinelibrary.wiley.com/doi/full/10.1002/ail2.20>.

Sun et al., "A Review of Unsupervised Keyphrase Extraction Methods Using Within-Collection Resources," Symmetry 2020, 12, 1864, Nov. 12, 2020, 20 pages. <https://www.mdp.com/2073-8994/12/11/1864/pdf>.

Vaswani et al., "Attention Is All You Need," arXiv:1706.03762v5 [cs.CL], 31st Conference on Neural Information Processing Systems (NIPS 2017), Dec. 6, 2017, 15 pages. <http://arxiv.org/abs/1706.03762>.

Velardi et al., "Mining the Web to Create Specialized Glossaries," IEEE Intelligent Systems, vol. 23, No. 5, Sep. 23, 2008, pp. 18-25. <https://ieeexplore.ieee.org/document/4629722>.

Certain functionality of the disclosure was stored on IBM servers internal to assignee, and this functionality was made available for sale as a service to via IBMs Research Deep Search platform on Mar. 2021. <https://www.research.ibm.com/science/deep-search/>.

* cited by examiner

202  In computer science and information theory, a Huffman code is a particular type of optimal prefix code that is commonly used for lossless data compression.

204  in |computer science| and |information theory| a |Huffman code| is a |particular type| of |optimal prefix code| that is commonly used for |lossless data compression|

206  in |computer science| and |information theory| a |Huffman code| is a ~~|particular type|~~ of |optimal prefix code| that is commonly used for |lossless data compression|

| 302 | Machine learning is valid approach to implement recommender systems. |

| 304 | NOUN Machine<br>NOUN learning | → | 314 | machine learning |

| 306 | AUX is<br>DET a |

| 308 | ADJ valid<br>NOUN approach | → | 316 | valid approach |

| 310 | PART to<br>VERB implement |

| 312 | NOUN recommender<br>NOUN systems | → | 318 | recommender systems |

…

TERM EXTRACTION IN HIGHLY TECHNICAL DOMAINS

BACKGROUND

The amount of data that enterprises and other organizations deal with is growing at an increasing rate. This is true for both structured data—i.e., data that is easily manageable in a database—and also unstructured or semi-structured data, such as raw text data. New research results are typically published as text documents comprising a lot of topic specific vocabulary. This information had to be processed completely manually in the past. Today's asymmetry between the amount of data and the limited human ability to process information manually combined with natural language processing (NLP) capabilities promote new ways to manage the content and knowledge of text documents.

SUMMARY

According to one aspect of the present disclosure, a computer-implemented method for fine-tuning of a transformer-based language model by extracting terminology terms from a text document may be provided. The method may comprise identifying a text snippet in the text document, identifying candidate multi-word expressions in the identified text snippet using part of speech tags, and determining a specificity score value for each of the candidate multi-word expressions. Thereby, the specificity score value may be indicative of how unique the candidate multi-word expression is within the text snippet.

Moreover the method may comprise determining a topic similarity score value for each of the candidate multi-word expressions as a distance between an embedding vector corresponding to the identified text snippet and an embedding vector corresponding to the candidate multi-word expression, selecting remaining expressions from the candidate multi-word expressions using a function of a specificity value and a topic similarity value of each of the candidate multi-word expressions, and adding a noun comprised in the text snippet to the remaining expressions depending on a function of a correlation of the noun with the same lemma as one of the remaining expressions and a noun morphology score value of the noun to be added.

Furthermore, the method may comprise labeling the remaining multi-word expressions, and fine-tuning an existing pre-trained transformer-based language model using the identified text snippet marked with the labeled remaining expressions as training data.

According to another aspect of the present disclosure, a terminology extraction system for fine-tuning of a transformer-based language model by extracting terminology terms from a text document may be provided. The system may comprise a processor and a memory, communicatively coupled to the processor, wherein the memory stores program code portions that when executed, may enable the processor to identify a text snippet in the text document, to identify candidate multi-word expressions in the identified text snippet using part of speech tags, and to determine a specificity score value for each of the candidate multi-word expressions, wherein the specificity score value is indicative of how unique the candidate multi-word expression is within the text snippet.

Additionally, the program code portion may enable the processor to determine a topic similarity score value for each of the candidate multi-word expressions as a distance between an embedding vector corresponding to the identified text snippet and an embedding vector corresponding to the candidate multi-word expression, to select remaining expressions from the candidate multi-word expressions using a function of a specificity value and a topic similarity value of each of the candidate multi-word expressions, and to add a noun comprised in the text snippet to the remaining expressions depending on a function of a correlation of the noun with the same lemma as one of the remaining expressions and a noun morphology score value of the noun to be added.

Furthermore, the program code portion may further enable the processor to label the remaining multi-word expressions, and to fine-tune an existing pre-trained transformer-based language model using the identified text snippet marked with the labeled remaining expressions as training data.

In some embodiments of the method, the selecting remaining expressions using a function of the specificity threshold value and a topic similarity value may comprise selecting remaining multi-word expressions from the candidate multi-word expressions if the specificity threshold value is greater than a predefined specificity threshold value, and if the topic similarity value is greater than a topic similarity threshold value. This may represent an effective way to combine dependencies of the specificity value and the topic similarity value and related threshold values. However, also other functions—in particular, weights for the different terms as part of the function—may also be possible. This way, this method may be tuned to be more specificity loaded or topic similarity loaded.

In some embodiments of the method, the selecting remaining expressions using a function of the specificity value and a topic value may comprise selecting a noun of the identified text snippet, if the noun has a score value—in particular, a specificity score value or a topic similarity value—that is greater than the lowest related multi-word expression score. Due to the fact, that score values for single nouns may only be determined after the score values for multi-word expressions, such a comparison may easily be done. It may also allow scoring single nouns in light of the scoring of the multi-word expressions. Thus, the scoring may be assessed in the same value space.

In some embodiments of the method, a noun can be selected if its score value is greater than the lowest multi-word expression score value. Additionally, the scores can be used to implement probabilistic noun selection mechanisms, where the probability of keeping the noun as a terminology term is a function of the specificity or topic similarity scores (e.g., the higher is the score, the higher is the probability to keep the noun in the set of terminology)

In some embodiments of the method, the part of speech tags may relate to adjectives, followed by nouns or related proper nouns. This may follow the somewhat established way of performing a part of speech (POS) text analysis. Hence, the here proposed approach may also—at least in parts—rely on existing technologies and use it to its advantage.

In some embodiments of the method, the specificity score value may be determined by using a pre-trained static embedding matrix or by using context dependent embeddings originating from a transformer based-system. For this, a pre-trained bidirectional encoder representations from transformers (BERT) or any other transformer-based language model may be used. Hence, also in this embodiment, already existing technologies may be used.

In some embodiments of the method, adding a noun of the text snippet to the remaining expressions may only comprise adding the noun to the remaining expressions if a number of sub-tokens required for representing the noun using a word segmentation algorithm trained on general-purpose text is greater than a predefined sub-token threshold value. Word segmentation algorithms such as BPE (Byte-Pair Encoding) and the variant WordPiece may be used in transformer-based language models to represent any sequence of text with a dictionary of a limited (and eventually small) size. The number of sub-tokens necessary to represent a word can be an indication of the morphology complexity of a specific noun. Thereby, a noun with a large number of sub-tokens may be considered as specific terminology for the new field of technology for which terms should be extracted from the text file.

In some embodiments of the method, using the remaining candidate expressions as training data may also comprise adding to the training data manually labeled data. Such data may be labeled by a human domain expert. And, in certain embodiments, using the remaining candidate expressions as training data may furthermore comprise adding to the training data annotated data from other sources. These may come from large dictionaries or catalogs comprising labeled expressions; one example would be Wikipedia, the known online encyclopedia.

In some embodiments of the method, the pre-trained transformer-based language model may be based on Bidirectional Encoder Representations from Transformers—e.g., the known BERT language model—or a Generative Pre-trained Transformer—e.g., GPT-3. However, in general, the here proposed method may be independent of specific language models. It may work as long as a pre-trained transformer-based language model may be used. Furthermore, a pre-trained transformer-based language model which has been trained with a general/average vocabulary may additionally get "skills" for a domain specific vocabulary, namely, the one being extracted by aspects of the disclosure.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating, or transporting the program for use, by, or in connection, with the instruction execution system, apparatus, or device.

BRIEF DESCRIPTION OF THE SEVERAL VIEWS OF THE DRAWINGS

It should be noted that embodiments of the disclosure are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present disclosure are apparent from the examples of embodiments to be described hereinafter and are explained with reference to the examples of embodiments, to which the disclosure is not limited.

FIG. 2 shows a block diagram of an example of how the identification of multi-word expressions works.

DETAILED DESCRIPTION

Figure 1:
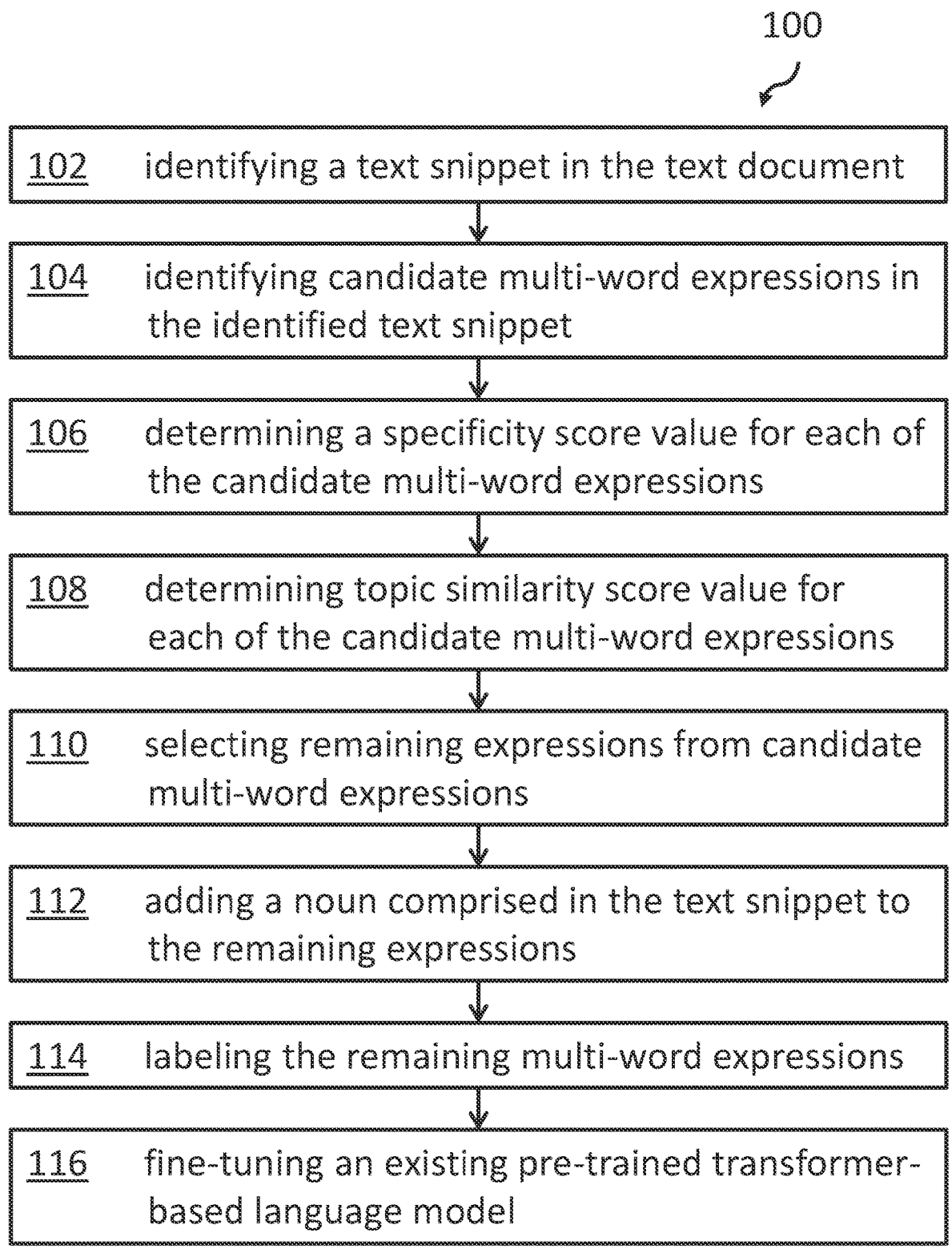
FIG. 1 shows a block diagram of an embodiment of the disclosure for fine-tuning of a transformer-based language model by extracting terminology terms from a text document.

Aspects of the disclosure relate generally to a method for fine-tuning of a language model, and more specifically, to a computer-implemented method for fine-tuning of a transformer-based language model by extracting terminology terms from a text document, while more particular aspects of the disclosure relate to a terminology extraction system for fine-tuning of a transformer-based language model by extracting terminology terms from a text document, and a computer program product.

Natural language processing (NLP) is becoming increasingly popular as a technique for processing raw unstructured and/or semi-structured text in order to transform this unstructured and/or semi-structured text into a more mineable and analyzable format. One growing application is training machine-learning systems that deal with natural text elements, and any other application that involved automated text processing (e.g., in the form of automatic term extraction (ATE) for extracting terminology from domain specific corpora). It may be used for summarizing text, providing a means of ranking information retrieval, and/or any other operation consistent with this disclosure that would be used within knowledge extraction and discovery.

Strictly related to ATE is the named entity recognition (NER) task. NER is an information extraction technology having the goal of locating and classifying named entities present in text into categories such as people, medical codes, organizations, and so on. While NER is targeting very specific categories of named entities, ATE is a more general task and can be of use in all the situations where the corpora domains (and its categories) are not known in advance or, when it is not feasible to train named entity recognition models due to the scarcity of annotated data.

Now, unsupervised ATE systems are the basic building block components for knowledge extraction systems for the domain where NER annotators are not available. In absence of NER for specific categories, a knowledge extraction system may rely on term extraction to build a graph which can create relationships between terms by using corpora level statistics such as frequency of co-occurrence between words in multi-word expressions. Although this graph is a crude approximation of the relationships of entities, it can be used as an approximation to dig through large amounts of text data.

Other systems might rely on existing NLP libraries to extract non-phrases from technical text. While noun-phrases can capture technical terms with high recall, the overall precision might be poor.

Some conventional system use text input (e.g., sentences) together with the annotations consisting of keywords present in those sentences to understand the meanings of sentences, where these conventional systems use the input consisting of the pair (sentence, keyword) to train a pre-trained bidirectional encoder representations from transformers (BERT) model. Specifically, conventional systems may use the keywords as mask object in the training procedure. Conversely, aspects of this disclosure may start a process with no annotations, and then subsequently annotate keywords in text.

Similarly, many conventional systems may identify important terms (e.g., the terms that are predominantly used to classify sentence and identify a topic/meaning/message of text) via attention coefficients provided by transformer models. For example, conventional systems may identify important terms via attention coefficients to attribute importance to individual words (e.g., in addition to conventional transformer models associating attention coefficients to individual sub-word units present in the transformer vocabulary). However, while the attention coefficient might be sufficient to represent common words which are represented with a single sub-word unit, it is not clear how the attention coefficients will perform to highlight words made of long sequences of subword units. Aspects of the disclosure address this technical problem by using similarity/specificity, as well as morphological features coming from sub-word tokenization, to leverage additional systems (e.g., entity linking).

Further, conventional systems often make use of multiple BERT models. As would be understood by one of ordinary skill in the art, multiple BERT models may cause the inference time to increase. Conversely, aspects of the disclosure may eliminate this problem by using a fine-tuning approach to make sure that all the computationally intensive machinery used to generate training data is not be called at inference time. This way aspects of this disclosure may "pay" the inference for a single transformer model.

Aspects of the disclosure that relate to fine-tuning of a transformer-based language model by extracting terminology terms from a text document may offer multiple advantages, technical effects, contributions and/or improvements. The technically advantageous effects may be brought about by a combination of semantic signals and morphology signals generated during an analysis of the text document. In natural language, highly specific terminology expressions tend to appear in clusters of words that have high semantic similarity. This property may be particularly visible in descriptive passages when highly specific terminology concepts are introduced as a specialization of the more generic ones. This may be elegantly captured with the specificity score. On the other hand, another semantic signal which can be used to determine whether a term may be technical may be the topic similarity. It may be expressed as a score associated to each text chunk of a sentence (either an individual word or a complete multi-word expression) which may be a measure of how semantically close a specific term is to the entire sentence. Advantageously, this may here be determined as a distance between the embedding corresponding to the word or multi-word expression and the embedding corresponding to the entire text, e.g., a paragraph or a sentence (or the complete document). In this way, multi scoring systems may be combined in order to increase the precision with which term extraction may be performed.

As a consequence—i.e., because of the processing of the term extraction—these terms which may also be automatically annotated in an unsupervised manner, may be transformed to a training data set in order to retrain an already existing machine-learning based language model (e.g., bidirectional encoder representations from transformers ((BERT), GPT-3) which may significantly reduce the time, the effort and computational required resources.

The proposed concept may also allow—beside the automatically generated annotated training data—to additionally include manually annotated data as well as annotated data from external sources (e.g., Wikipedia or other knowledge management systems).

Hence, the approach proposed here may allow using computationally expensive operations to generate the training data set and fine-tune a transformer-based language model since those operations may not influence the final inference latency. For example, one may use record linkage solutions to boost the scores of the multi-word expressions if they correspond to concepts in external knowledge bases such as Wikipedia. Additionally, another benefit of this approach may be that instead of trying to fix systematic mistakes done by the extractor of multi-word expression candidates by means of rules in the code, one may manually annotate cases that have to be fixed and rely on the fine-tuning approach.

Furthermore and although not being the primary goal, the concepts proposed here may have drastic consequences for knowledge graphs which consecutively can be built from the found multi-word expressions in the text. Not only does the increased precision reduce the noise in the knowledge graphs, but the additional filtering may also reduce the memory footprint—meaning that fewer nodes in the knowledge graph are required—and may therefore be able to reduce the query latency significantly, because less edges have to be traversed.

This impact may be described as significant, as document centric knowledge graphs may often use word clouds now comprised in non-phrases (or multi-word expressions) to aid in searches (e.g., for literature) and/or complex queries. By increasing the quality of the found non-phrases in the document according to the proposed method, aspects of the disclosure may realize three different improvements regarding such document centric knowledge graphs: (i) by improving the quality of the noun-phrases, one typically can reduce the noise in the searches; (ii) the memory footprint of the knowledge graph is reduced by reducing the overall number of noun-phrases; (iii) and, the query latency is reduced because of the reduction of the overall number of noun-phrases which generally leads to knowledge graphs with less number of edges. Specific results of these advantages could be shown throughout the development of the here proposed concept.

Fine-tuning a transformer-based language model with the generated or manually annotated data allows the system to improve the generalization capabilities via transfer learning (i.e. the transformer model is usually pre-trained on large corpora spanning from different domains).

Further, the described unsupervised approach can be used to generate large datasets of training labels directly on the specific domain on interest. This property makes the system less dependent on the quality of the pre-trained language model and makes it possible to use very small models for the term extraction task. In fact, while having large pre-trained language models may be a strict necessity when the number of labels is relatively small, with the approach described herein one can generate labels by running the annotator over large domain-specific corpora and use those labels at fine-tuning time. With large enough labeled datasets, one can directly train the transformer-model skipping the pre-train phase altogether.

In the context of this description, the following conventions, terms and/or expressions may be used:

The term 'terminology term' may denote a single word or a multi-word expression in, e.g., a scientific text, or another domain specific text comprising expressions not being part of a general language model. The general language model may represent terms and expressions of day-to-day conversations. On the other hand, domain specific texts may comprise a specific terminology comprising terms and expressions—single or multi-word expressions—being significantly different from the day-to-day language. Examples may be tri-chloro-methane, Ciprofloxacin, relational database or transport communication protocol/Internet protocol (TCP/IP). The human eye/brain combination may identify such terms immediately when skimming through an unknown text.

The term 'text document' may denote a document—such as one in electronic form—comprising human readable text comprising letters, words, sentences and potentially paragraphs.

The term 'text snippet' may denote a sequence of words or expressions of the text document. A typical text snippet may be a sentence. However—in particular in case of very long sentences—also sub-sentences may be denoted and used as text snippet, similar to headlines or other shortened statements.

The term 'candidate multi-word expression' may denote a multi-word expression which has been identified as potential element of the training data for the fine-tuning of the pre-trained language model. However, the candidate multi-word expression may be further assessed by scoring methods before they are consolidated to remaining expressions which may then be used as final training data.

The term 'part-of-speech tag' (or part-of-speech tagging, or PoS tagging or POST) may denote a method for a grammatical taking in the process of marking up a word in the text (corpus) as corresponding to a particular part of speech based on both, its definition and its context. Here, in computational linguistics, both types of known POS-tagging may be used, would-based and stochastic ones.

The term 'specificity score value' (linguistic meaning) may denote a numerical value for a term or expression in the context of the text snippet. The specificity is thereby a semantic feature of a noun phrase that distinguishes between entities/nouns/referents that are unique in a given context and those that are not.

The term 'topic similarity score value' may denote a numerical value describing whether a term or expression may be similar to the meaning of the text snippet or the text document it relates to, i.e., it is comprised in.

The term 'distance' may denote a difference of numerical values describing a position within a mathematical field. Different types of distances are known. Here, for each word of multi-word expression, a topic score may be determined as distance—in particular, as cosine similarity—between the embedding vector of the entire text and the embedding vector of the word/noun (or multi-word expression).

The term 'embedding vector' may denote a low-dimensional space into which one may translate or transform high-dimensional vectors. Typically, such embedding's may be used to make it easier to perform machine-learning on large inputs like sparse vector comprising words. Similar expressions in the high-dimensional vectors may have only a short distance to each other in the form of embedding vectors.

The term 'remaining expression' may denote a multi-word expression or a noun that may no longer be a candidate multi-word expression or noun, i.e., it may have been determined that the remaining expression may be used as training data. The group of remaining expressions does not comprise "unsafe" terms any longer.

The term 'lemma' may denote an abstract conceptual form of a word that may actually have been mentioned selected for utterance of the early stages of speech production. A lemma may represent a specific meaning but may not have any specific sound associated with it. In short, a synonym for "lemma" in the context of this text may be a concept.

The term 'fine-tuning' may denote a further training step for a transformer-based language model. Hence, the existing transformer based language model may comprise an already trained language model. However, this language model may be pretty generic. By virtue of the fine-tuning, the pre-trained transformer based language model may also "learn" an additional set of domain specific terms and multi-word expressions. Hence, the proposed concept may also be denoted as transfer learning, in particular from a generic language model to one also trained to use domain specific vocabulary.

The term 'pre-trained transformer-based language model' may denote a deep learning model designed to utilize the mechanism of attention, weighing the influence of different parts of the input data, e.g., a neural network with a plurality of hidden layers used in the field of natural language processing (NLP). Transformer-based models are designed to handle sequential data, such as natural language, for tasks such as translation in text summarization or—as explained here—for an extraction of specific terms and expressions. As already mentioned, the transformer-based language model may also be pre-trained with a generic corpus to which—by the virtual of the concept proposed here—domain specific vocabulary may be added. As transformer-based language models, BERT and GPT-3 shall be mentioned. However, other models may exist.

The term 'training data' may denote data to be used for a further training process of a language model, in particular, a transformer-based language model. Training data should be labeled during a supervised training process. However, if the labeling of additional or new terms may be done in an automated way—by starting from a domain specific text document and applying the proposed method—the training process may be described as unsupervised training, although automatically labeled data may be used.

The term 'sub-token' may denote one of a plurality of tokens relating to a, e.g., longer word. Simple words of common language may be represented by one single token in a language model. However, rare words in a language corpus may be separated into a plurality of sub-tokens. Thereby, the length of the sub-tokens may be used as an indirect measure of the morphology of "complexity". Hence, the more complex a word or noun may appear in a given context of a text snippet or longer text, the more sub-tokens may be used in order to represent the word/expression, the higher the probability is for a domain specific term, and the more likely it may become that such amount may be used as a training data, i.e., as remaining expression.

The term 'spaCy' relates to the known open-source software library for natural language processing (compare, e.g., https://spacy.io). The term 'CoreNLP' relates to the Stanford natural language processing library (compare, e.g., https://stanfordnlp.github.io/CoreNLP).

The term 'embedding' may denote—in particular in computer linguistics—a sort of encoding of natural linguistic words used for a representation of words for text analysis, typically in the form of a real-valued vector that encodes the meaning of the word such that the words that are closer in the vector space are expected to be similar in meaning. Word embeddings may be obtained using a set of language modeling and feature learning techniques where words or phrases from the vocabulary are mapped to vectors of real numbers. Conceptually it involves a mathematical embedding from a space with many dimensions per word to a continuous vector space with a much lower dimension, i.e., a vector space transformation for dimensionality reduction.

The term 'IOB format' (short for Inside, Outside, Beginning) may denote the known common tagging format for tagging tokens in a chunking task in computational linguistics (e.g., named-entity recognition). It was presented by Ramshaw and Marcus in their 1995 paper "Text Chunking using Transformation-Based Learning". The 'I'-prefix before a tag may indicate that the tag is inside a chunk. An 'O' tag may indicate that a token belongs to no chunk. The 'B'-prefix before a tag may indicate that the tag is the beginning of a chunk that immediately follows another chunk without O-tags between them. It is only used in this case: If a chunk comes after an O-tag, the first token of the chunk may take the I-prefix.

The term 'Byte-Pair Encoding' (BPE) may denote a sub-word tokenization algorithm, inspired by the Byte-Pair-Encoding algorithm in compression, which, starting from single characters, may build a vocabulary in an incremental way, by merging the most frequent bigrams in a corpora till a specified vocabulary size is reached.

The term 'WordPiece' may denote a word segmentation technique similar to BPE, wherein the potential merges are not scored by frequency of bigrams, but using the likelihood of an n-gram model trained on a corpus where the specific merge may be applied.

In the following, a detailed description of the figures will be given. Firstly, a block diagram of an embodiment for fine-tuning of a transformer-based language model by extracting terminology terms from a text document is given. Afterwards, further embodiments, as well as embodiments of the terminology extraction system for fine-tuning of a transformer-based language model by extracting terminology terms from a text document will be described.

FIG. 1 shows a block diagram of an embodiment of the computer-implemented method 100 for fine-tuning—in particular, during an unsupervised way—of a transformer-based language model by extracting terminology terms and/or key phrases from a text document, in particular from a highly technical domain. The method comprises identifying (102) a text snippet like a sentence, a half-sentence, a paragraph, headline, and similar—in the text document, and identifying (104) candidate—i.e., potential—multi-word expressions in the identified text snippet using part-of-speech (POS) tags. In some embodiments, the method would be enabled to identify a plurality of multi-word expressions in multiple text snippets in the domain specific text document.

The IOB annotation from some sentences of text is also advantageously done by the concept proposed here.

Next, the method 100 comprises determining (106) a specificity score value for each of the candidate multi-word expressions. Thereby, the specificity score value is indicative of how unique—i.e., relevant or representative—the candidate multi-word expression is within the text snippet. This may, e.g., be performed by a pairwise distances determination in the embedding space; the shorter the distance is determined the more specific the multi-word expression is for the text snippet.

Hence, the method 100 comprises determining (108) a topic similarity score value for each of the candidate multi-word expressions as a distance—e.g., a cosine similarity—between an embedding vector corresponding to the identified text snippet and an embedding vector corresponding to the candidate multi-word expression.

Next, the method 100 comprises selecting (110) remaining expressions from the candidate multi-word expressions using a function of a specificity value and a topic similarity value of each of the candidate multi-word expressions. Hence, the remaining expressions are those not comprising deselected multi-word expressions anymore. Hence it is a subset of the candidate multi-word expressions.

Furthermore, the method 100 comprises adding (112) a noun—i.e., a single word comprised in the text snippet to the remaining expressions depending on a function of a correlation of the noun with the same lemma as one of the remaining expressions and a noun morphology score value of the noun to be added. So far nouns have not been reflected in the selection process, but only multi-word expressions. However, also single nouns may represent important terms in the domain specific text document. Hence, they should also be used as training data.

As already mentioned during the explanation of some embodiments above, one option to achieve this is by determining whether the lemma of the noun is the same as of one the head of the multi-word expressions. Thereby, in linguistics, the "head" or nucleus of a phrase is the word that determines the syntactic category of that phrase. For example, the head of the noun phrase boiling hot water is the noun water. Moreover, the method 100 comprises labeling (114) the remaining multi-word expressions, e.g., in IOB (Inside-Outside-Beginning) format, and finally fine-tuning (116) an existing pre-trained transformer-based language model—like, e.g., BERT or GPT-3—using as training data the identified text snippet marked with the labeled remaining expressions (in IOB form).

In a real-life use case, more than one text snippet and related remaining expression would be used. Hence, during this step, a transfer learning from a general language corpus to a corpus with a domain specific extension can happen.

FIG. 2 shows a block diagram 200 of an example of how the identification of multi-word expressions works. The sentence 202 builds the basis for this example. It may be the text snippet. So, candidate multi-word expression would be the ones highlighted by the blocks encircling at least two words in the block 204. However, not all multi-word expressions are representative for the context laid out by the initial sentence 202. This applies to the multi-word expression "particular type". Hence, it is filtered out (compare 206) by the proposed method using the explained threshold values. It can also be seen that not only two word expressions are identified but also three word expressions like "lossless data compression" in an adjective-noun-noun combination.

Figure 3:
FIG. 3 shows a block diagram of an example of a sentence with POS tagging.

FIG. 3 shows a block diagram 300 of an example of the sentence 302 used in FIG. 2 (compare FIG. 2, 202) with POS tagging. Using a natural language processing library, such as SpaCy or CoreNLP, for the POS tagging task, one can extract candidate multi-word expressions, consisting of sequences of zero or more adjectives (ADJ) followed by nouns (NOUN) or proper nouns (PROPN) sequences. This fundamental chunking step allows identifying possible candidate terminology terms expressed via multi-word expressions. Hence, in this example, the sentence is segregated into five sub-sentence groups 304, 306, 308, 310, and 312. Also shown in these boxes is how the terms are tagged, namely, as NOUNs, ADJectives, VERBs, and so on. As can also be seen, multi-word expression 314, 316, 318 of combinations of two nouns or an adjective and a noun are selected.

Figure 4:
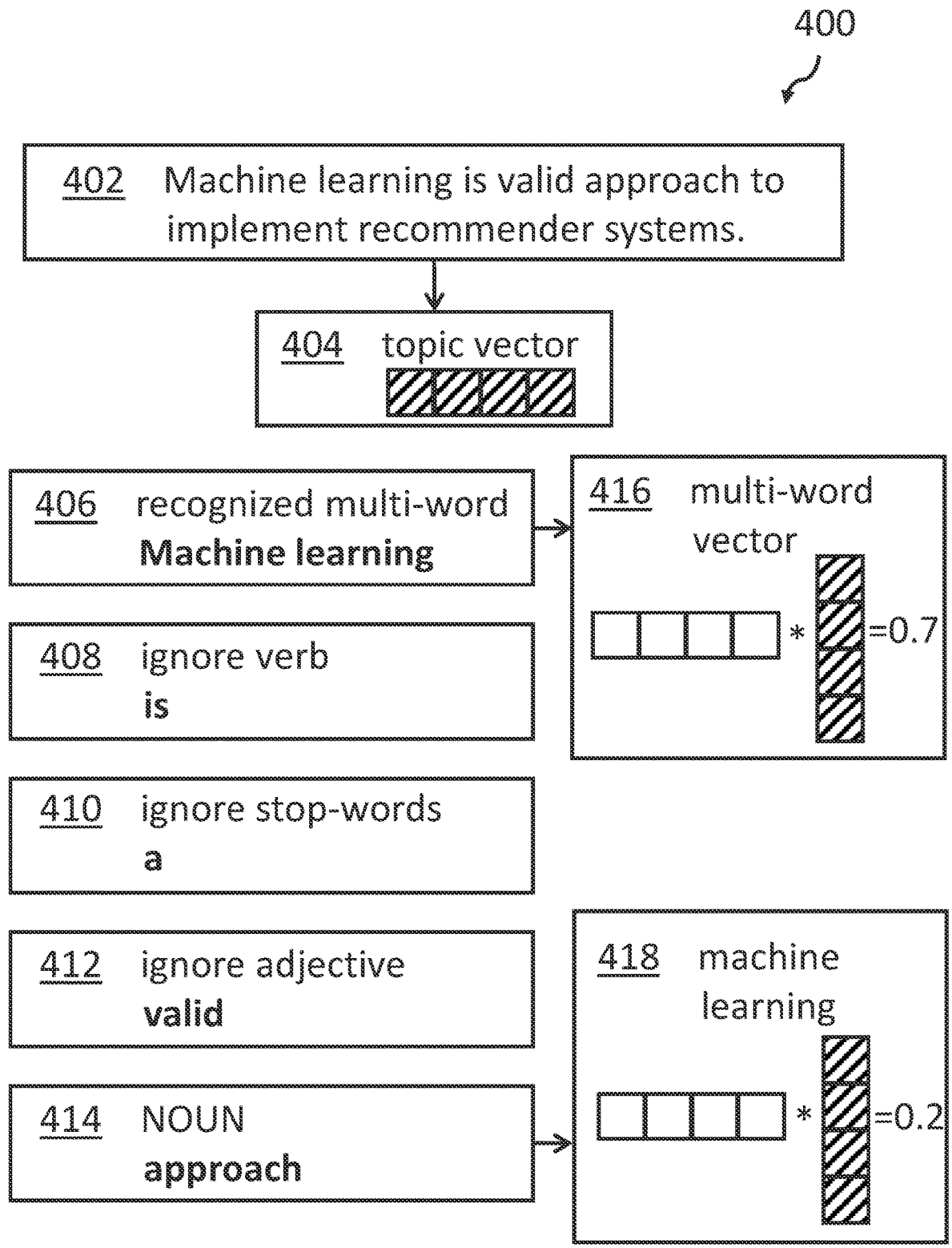
FIG. 4 shows a block diagram of an example for a topic similarity determination.

FIG. 4 shows a block diagram 400 of an example for a topic similarity determination. As example, the sentence 402 of FIG. 2 (compare FIG. 2, 202) is used. A topic vector 404 is from the sentence 402. For each multi-word expression, the specificity score as described above may be determined. Multi-word expressions with a lower mean value of the pairwise distance are intended to conform to a more specific terminology. The specificity score value can be determined by considering the pair-wise distance in an embedding space (e.g., using a pre-trained BERT as a feature extractor to obtain embeddings for each word and multi-word expression). For each multi-word expression, the topic score is the distance between the topic vector determined, which is the embedding vector for the entire sentence and the embedding vector corresponding to the multi-word expression. The cased version of a pre-trained BERT model may offer the best results in some examples, but other embedding methods can be used as a drop-in replacement and do not affect aspects of the disclosure. Once the score values are determined, one can remove multi-word expressions which specificity or topic score below a threshold as already mentioned above.

To be more precise, a multi-word vector 416 is created from the recognized, 406, multi-word "machine learning" and multiplied (using the vector dot product) by the topic vector 404 if the text snippet 402 giving a distance of, e.g., 0.7. The next verb "is" 408, the stop-word "a" 410, and the adjective "valid" 412 are ignored. Similarly, another vector 418 is built from the noun "approach" 414, where this vector 418 is multiplied with the topic vector, delivering, e.g., a result of 0.2. Now, the threshold value for selecting words having a specific topic similarity score value is in-between 0.2 and 0.7, the term "approach" is found not to be close enough to the vector of the complete sentence 402. Thus, "machine learning" has the required topic similarity score value to be considered as one of the multi-word expressions for the training data.

Figure 5:
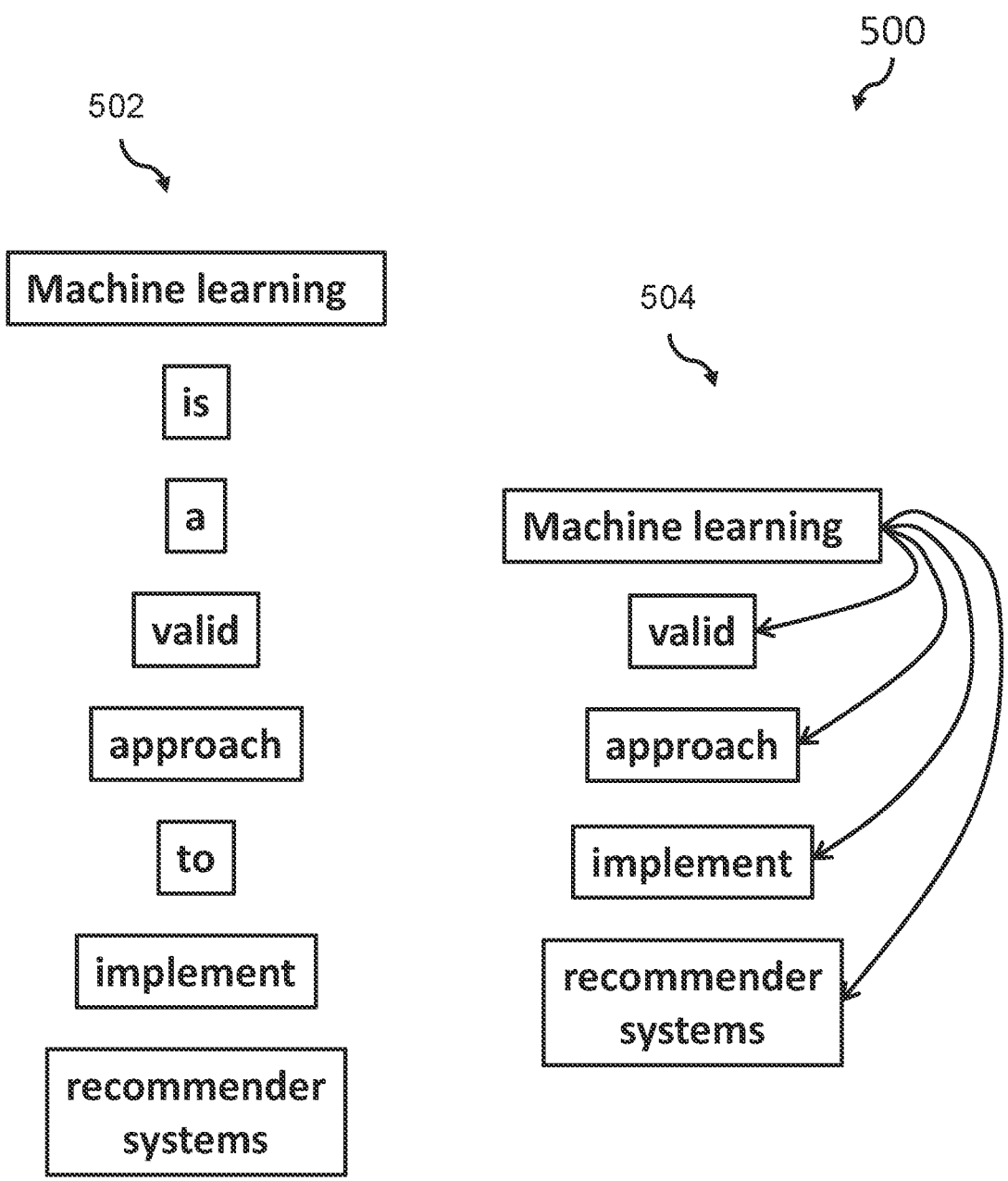
FIG. 5 is used to illustrate the effect of the specificity score value.

FIG. 5 is used to illustrate the effect 500 of the specificity score value for extracting for each instance-based specificity score value for each word in the training data selection process. Thereby, for each mention of a word/multi-word expression a score value is determined in the following way: given a mention and the surrounding context (e.g., a sentence or text snippet) the specificity score is computed as the average of the pairwise distances (in the embedding space) between the mention and all the other words/multi-word expression in the context. The left side of the figure shows the original text snippet 502, whereas the partial FIG. 504 shows between which words or multi-words distance values are determined. Thereby, "unimportant words (e.g., stop words) like "is", "a", "to" are ignored.

Next, the distances in the form of cosine similarities are determined in the embedding space (i.e., dot product of the vectors when the vectors are normalized to the unit norm). Thereby, it is assumed that a measure of similarity between two non-zero vectors of an inner product space is denoted as cosine similarity or cosine distance. It is defined to equal the cosine value of the angle between them, which is also the same as the inner product of the same vectors normalized to both have length 1. The cosine of 0° is 1, and it is less than 1 for any angle in the interval (0, π] radians. It is thus a judgment of orientation and not magnitude. In this example two vectors with the same orientation may have a cosine similarity of 1, two vectors oriented at 90° relative to each other may have a similarity of 0, and two vectors diametrically opposed may have a similarity of −1, independent of their magnitude.

Figure 6:
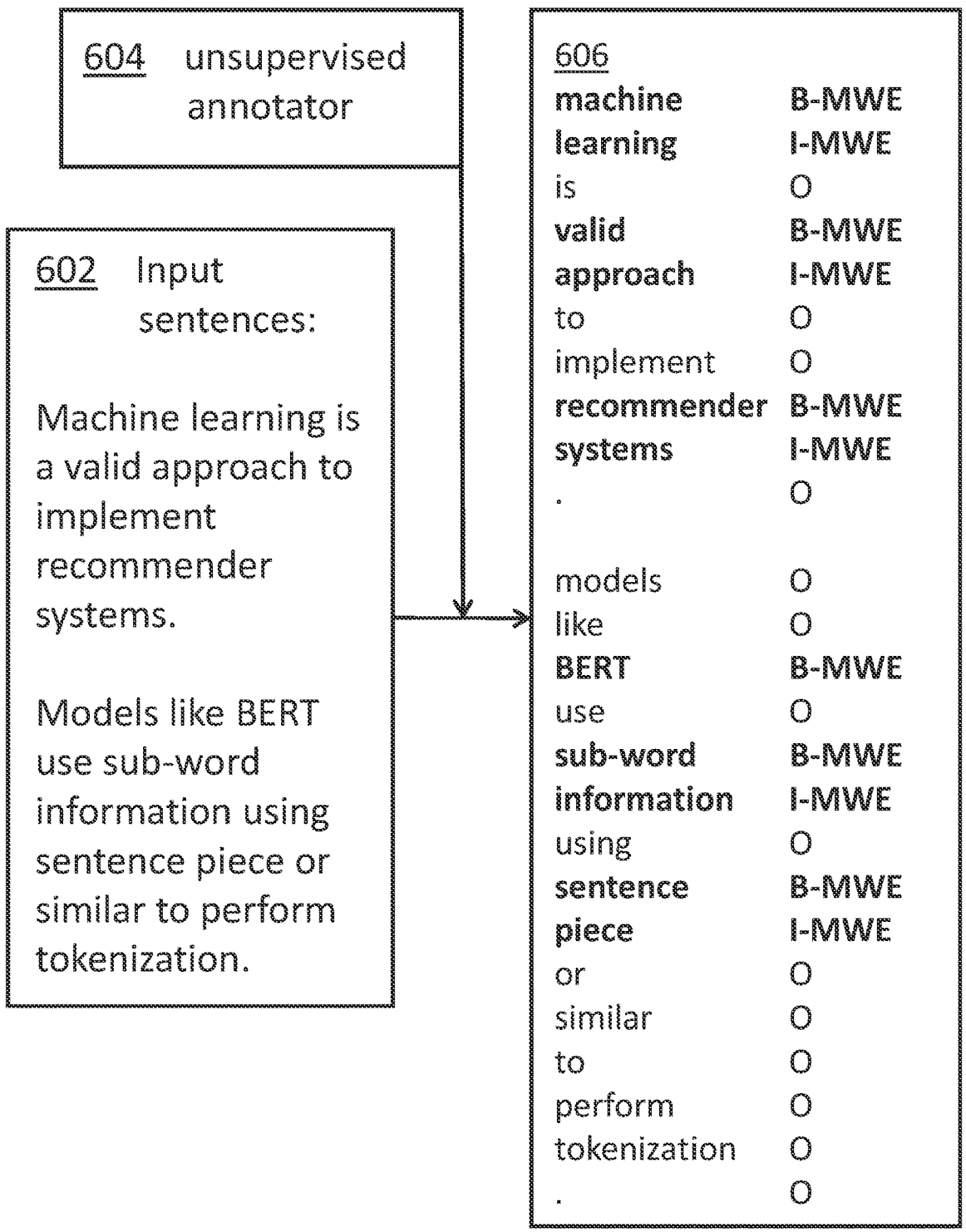
FIG. 6 shows a block diagram of an example of an automatically tagged list of training data in IOB format.

FIG. 6 shows a block diagram of an example 600 of an automatically tagged list of training data in IOB format. Block 602 indicates to input sentences, namely, "machine learning is a valid approach to implement recommender systems" and "models like BERT use sub-word information using sentence pieces or the like to perform tokenization". With the help of an unsupervised annotator 604, the annotation illustrated in block 606 can be generated. Thereby, each word is given in annotation in the form of 'B-MWE', 'I-MWE' or 'O'. Using this schema, multi-word expressions can be identified among and between those words not being recognized as candidate multi-word expressions or nouns. Such lists as in block 606 together with the original text snippet are then used as training data for a pre-trained transformer-based language model for fine-tuning of the transformer. This is shown in the next figure.

Figure 7:
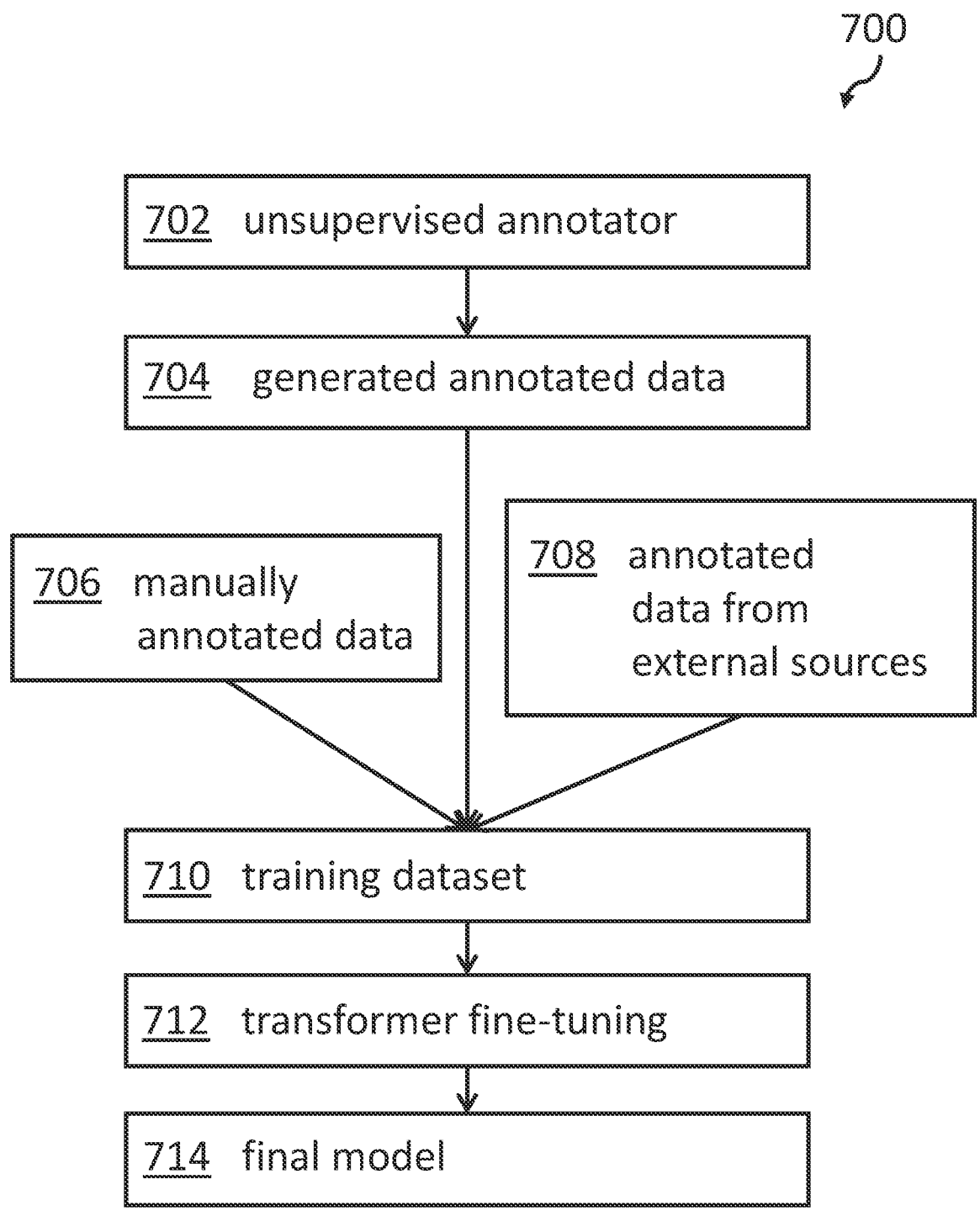
FIG. 7 shows a flowchart of an embodiment of how to fine-tune a transformer-based language model according to the proposed concept.

FIG. 7 shows a sort of flowchart 700 of an embodiment of how to fine-tune a transformer-based language model according to the proposed concept. As explained above, during an unsupervised annotation process by an unsupervised annotator 702 additional annotated training data 704 are generated. They built the core of the training data set 710 to be used for the transformer fine-tuning 712 to build the final language model 714 also comprising—beside the general language model of the pre-trained transformer—domain specific vocabulary which has been extracted from highly domain specific text documents or text snippets.

In addition to the generated annotated data 702, the proposed concept also allows to use manually annotated data 706 to contribute to the new training data set 710. This is also true for other annotated data 708 from external sources which may also contribute to the training data set 710.

Figure 8:
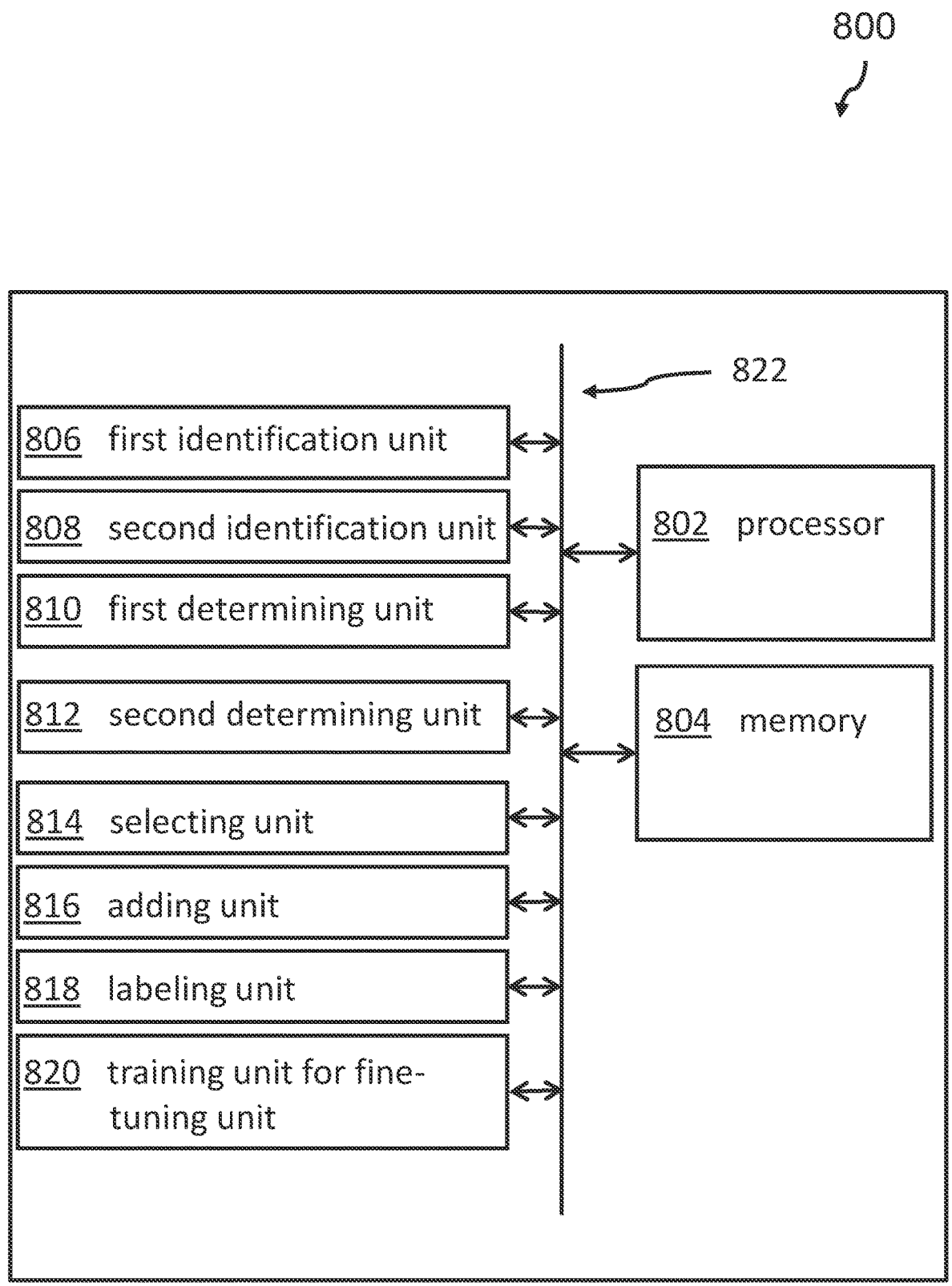
FIG. 8 shows a block diagram of an embodiment of the terminology extraction system for fine-tuning of a transformer-based language model by extracting terminology terms from a text document.

Last but not least, FIG. 8 shows a block diagram of an embodiment of the terminology extraction system 800 for fine-tuning of a transformer-based language model by extracting terminology terms from a text document. The system 800 comprises a processor 802 and a memory 804, communicatively coupled to the processor 802, wherein the memory 804 stores program code portions that when executed, enable the processor, to identify—in particular, by a first identification unit 806—a text snippet in the text document, to identify—in particular, by a second identification unit 808—candidate multi-word expressions in the identified text snippet using part of speech tags, and to determine—in particular, by a first determination unit 810—a specificity score value for each of the candidate multi-word expressions. Thereby, the specificity score value is indicative of how unique the candidate multi-word expression is within the text snippet.

Furthermore, the program code portions enable the processor 802 also to determine—in particular, by the second determination unit 812—a topic similarity score value for each of the candidate multi-word expressions as a distance between an embedding vector corresponding to the identified text snippet and an embedding vector corresponding to the candidate multi-word expression, to select—in particular, by a selection unit 814—remaining expressions from the candidate multi-word expressions using a function of a specificity value and a topic similarity value of each of the candidate multi-word expressions, and to add—in particular, by an adding unit 816—a noun comprised in the text snippet to the remaining expressions depending on a function of a correlation of the noun with the same lemma as one of the remaining expressions and a noun morphology score value of the noun to be added.

Moreover, the program code portions enable the processor 802 also to label—in particular, by the labeling unit 818—the remaining multi-word expressions, and to fine-tune an existing pre-trained transformer-based language model using as training data the identified text snippet marked with the labeled remaining expressions.

It is shall also be mentioned that all functional units, modules and functional blocks—in particular, the processor 804, the memory 802, the first identifying unit 806, the second identifying unit 808, first determining unit 810, second determining unit 812, selecting unit 814, the adding unit 816 and the labeling unit 818, the training unit for fine-tuning unit 820—may be communicatively coupled to each other for signal or message exchange in a selected 1:1 manner. Alternatively the functional units, modules and functional blocks can be linked to a system internal bus system 822 for a selective signal or message exchange.

Figure 9:
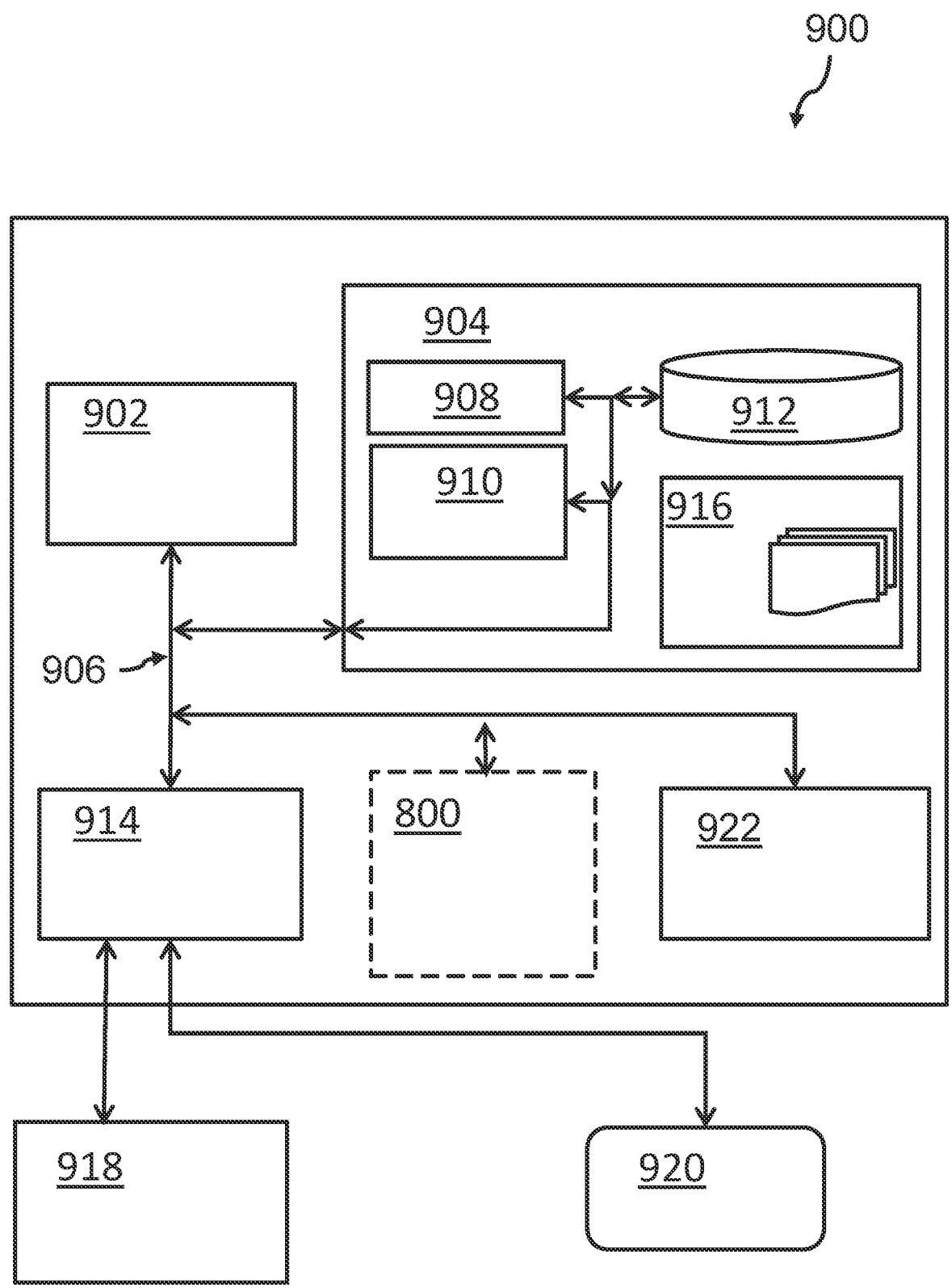
FIG. 9 shows an embodiment of a computing system comprising the system according to FIG. 8.

Embodiments of the disclosure may be implemented together with virtually any type of computer, regardless of the platform being suitable for storing and/or executing program code. FIG. 9 shows, as an example, a computing system 900 suitable for executing program code related to the proposed method.

The computing system 900 is only one example of a suitable computer system, and is not intended to suggest any limitation as to the scope of use or functionality of embodiments of the disclosure described herein, regardless, whether the computer system 900 is capable of being implemented and/or performing any of the functionality set forth hereinabove. In the computer system 900, there are components, which are operational with numerous other general purpose or special purpose computing system environments or configurations. Examples of well-known computing systems, environments, and/or configurations that may be suitable for use with computer system/server 900 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 900 may be described in the general context of computer system-executable instructions, such as program modules, being executed by a computer system 900. Generally, program modules may include routines, programs, objects, components, logic, data structures, and so on that perform particular tasks or implement particular abstract data types. Computer system/server 900 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 900 is shown in the form of a general-purpose computing device. The components of computer system/server 900 may include, but are not limited to, one or more processors or processing units 902, a system memory 904, and a bus 906 that couple various system components including system memory 904 to the processor 902. Bus 906 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 900 typically includes a variety of computer system readable media. Such media may be any available media that is accessible by computer system/server 900, and it includes both, volatile and non-volatile media, removable and non-removable media.

The system memory 904 may include computer system readable media in the form of volatile memory, such as random-access memory (RAM) 908 and/or cache memory 910. Computer system/server 900 may further include other removable/non-removable, volatile/non-volatile computer system storage media. By way of example only, a storage system 912 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 906 by one or more data media interfaces. As will be further depicted and described below, memory 904 may include at least one program product having a set (e.g., at least one) of program modules that are configured to carry out the functions of embodiments of the disclosure.

The program/utility, having a set (at least one) of program modules 916, may be stored in memory 904 by way of example, and not limiting, as well as an operating system, one or more application programs, other program modules, and program data. Each of the operating systems, one or more application programs, other program modules, and program data or some combination thereof, may include an implementation of a networking environment. Program modules 916 generally carry out the functions and/or methodologies of embodiments of the disclosure, as described herein.

The computer system/server 900 may also communicate with one or more external devices 918 such as a keyboard, a pointing device, a display 920, etc.; one or more devices that enable a user to interact with computer system/server 900; and/or any devices (e.g., network card, modem, etc.) that enable computer system/server 900 to communicate with one or more other computing devices. Such communication can occur via Input/Output (I/O) interfaces 914. Still yet, computer system/server 900 may communicate with one or more networks such as a local area network (LAN), a general wide area network (WAN), and/or a public network (e.g., the Internet) via network adapter 922. As depicted, network adapter 922 may communicate with the other components of the computer system/server 900 via bus 906. It should be understood that, although not shown, other hardware and/or software components could be used in conjunction with computer system/server 900. Examples include, but are not limited to: microcode, device drivers, redundant processing units, external disk drive arrays, RAID systems, tape drives, and data archival storage systems, etc.

Additionally, the terminology extraction system 800 for fine-tuning of a transformer-based language model by extracting terminology terms from a text document may be attached to the bus system 906.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the C programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms a, an and the are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

Aspects of the disclosure relate to the following clauses:

Clause 1: A computer-implemented method for fine-tuning of a transformer-based language model by extracting terminology terms from a text document, said method comprising: identifying a text snippet in said text document; identifying candidate multi-word expressions in said identified text snippet using part of speech tags; determining a specificity score value for each of said candidate multi-word expressions, wherein said specificity score value is indicative of how unique said candidate multi-word expression is within said text snippet; determining a topic similarity score value for each of said candidate multi-word expressions as a distance between an embedding vector corresponding to said identified text snippet and an embedding vector corresponding to said candidate multi-word expression; selecting remaining expressions from said candidate multi-word expressions using a function of a specificity value and a topic similarity value of each of said candidate multi-word expressions; adding a noun comprised in said text snippet to said remaining expressions depending on a function of a correlation of said noun with a same lemma as one of said remaining expressions and a noun morphology score value of said noun to be added; labeling said remaining multi-word expressions; and fine-tuning an existing pre-trained transformer-based language model using as training data said identified text snippet marked with said labeled remaining expressions.

Clause 2: the method according to clause 1, wherein selecting remaining expressions using a function of said specificity threshold value and a topic similarity value comprises: selecting remaining multi-word expressions from said candidate multi-word expressions if said specificity threshold value is greater than a predefined specificity threshold value and if said topic similarity value is greater than a topic similarity threshold value.

Clause 3: the method according to either of clauses 1 or 2, wherein selecting remaining expressions using a function of said specificity value and a topic value comprises-selecting a noun of said identified text snippet if said noun has a score value that is greater than said lowest related multi-word expression score value.

Clause 4: the method according to clause 3, wherein said selecting said noun if is score value is greater than said lowest related multi-word expression score value is used as a probabilistic approach to noun selection.

Clause 5: the method according to any of the preceding clauses, wherein said part of speech tags relate to adjectives, followed by nouns or related proper nouns.

Clause 6: the method according to any of the preceding clauses, wherein said specificity score value is determined by using a pre-trained static embedding matrix or by using context dependent embeddings originating from a transformer based-system.

Clause 7: the method according to any of the preceding clauses, wherein said adding a noun comprised in said text snippet to said remaining expressions comprises adding said noun to said remaining expressions only if a number of sub-tokens required for representing said noun is greater than a predefined sub-token threshold value.

Clause 8: the method according to any of the preceding clauses, wherein said using said remaining candidate expressions as training data also comprises adding to said training data manually labeled data.

Clause 9: the method according to any of the preceding clauses, wherein said using said remaining candidate expressions as training data also comprises adding to said training data annotated data from other sources.

Clause 10: the method according to any of the preceding clauses, wherein said pre-trained transformer-based language model is based on Bidirectional Encoder Representations from Transformers or a Generative Pre-trained Transformer.

Clause 11: a terminology extraction system for fine-tuning of a transformer-based language model by extracting terminology terms from a text document, said system comprising: a processor and a memory, communicatively coupled to said processor, wherein said memory stores program code portions that when executed, enable said processor, to: identify a text snippet in said text document; identify candidate multi-word expressions in said identified text snippet using part of speech tags; determine a specificity score value for each of said candidate multi-word expressions, wherein said specificity score value is indicative of how unique said candidate multi-word expression is within said text snippet; determine a topic similarity score value for each of said candidate multi-word expressions as a distance between an embedding vector corresponding to said identified text snippet and an embedding vector corresponding to said candidate multi-word expression; select remaining expressions from said candidate multi-word expressions using a function of a specificity value and a topic similarity value of each of said candidate multi-word expressions; add a noun comprised in said text snippet to said remaining expressions depending on a function of a correlation of said noun with a same lemma as one of said remaining expressions and a noun morphology score value of said noun to be added; label said remaining multi-word expressions; and fine-tune an existing pre-trained transformer-based language model using as training data said identified text snippet marked with said labeled remaining expressions.

Clause 12: the system according to clause 11, wherein said program code instructions enable said processor during said selecting remaining expressions using a function of said specificity threshold value and a topic similarity value also to select remaining multi-word expressions from said candidate multi-word expressions if said specificity threshold value is greater than a predefined specificity threshold value and if said topic similarity value is greater than a topic similarity threshold value.

Clause 13: the system according to either of clauses 11 or 12, wherein said program code instructions enable said processor during said selecting remaining expressions using a function of said specificity value and a topic value also to select a noun of said identified text snippet if said noun has a score value that is greater than said lowest related multi-word expression score value.

Clause 14: the system according to clause 13, wherein said program code instructions enable said processor also to use selection said noun if its score value is greater than said lowest related multi-word expression score value as a probabilistic approach to noun selection.

Clause 15: the system according to any of the clauses 11 to 14, wherein said part of speech tags relate to adjectives, followed by nouns or related proper nouns.

Clause 16: the system according to any of the clauses 11 to 15, wherein said program code instructions enable said processor during said determination said specificity score value also to use a pre-trained static embedding matrix or to use context dependent embeddings originating from a transformer-based system.

Clause 17: the system according to any of clauses 11 to 16, wherein said program code instructions enable said processor during said adding a noun comprised in said text snippet to said remaining expressions also to add said noun only to said remaining expressions if a number of sub-tokens required for representing said noun is greater than a predefined sub-token threshold.

Clause 18: the system according to any of clauses 11 to 17, wherein said program code instructions enable said processor during said using said remaining candidate expressions as training data also to add to said training data manually labeled data.

Clause 19: the system according to any of clauses 11 to 18, wherein said program code instructions enable said processor during said using said remaining candidate expressions as training data also to add to said training data annotated data from other sources.

Clause 20: a computer program product for fine-tuning of a transformer-based language model by extracting terminology terms from a text document, said computer program product comprising a computer readable storage medium having program instructions embodied said therewith, said program instructions being executable by one or more computing systems or controllers to cause said one or more computing systems to: identify a text snippet in said text document; identify candidate multi-word expressions in said identified text snippet using part of speech tags; determine a specificity score value for each of said candidate multi-word expressions, wherein said specificity score value is indicative of how unique said candidate multi-word expression is within said text snippet; determine a topic similarity score value for each of said candidate multi-word expressions as a distance between an embedding vector corresponding to said identified text snippet and an embedding vector corresponding to said candidate multi-word expression; select remaining expressions from said candidate multi-word expressions using a function of a specificity value and a topic similarity value of each of said candidate multi-word expressions; add a noun comprised in said text snippet to said remaining expressions depending on a function of a correlation of said noun with a same lemma as one of said remaining expressions and a noun morphology score value of said noun to be added; label said remaining multi-word expressions; and fine-tune an existing pre-trained transformer-based language model using as training data said identified text snippet marked with said labeled remaining expressions.

What is claimed is:

1. A computer-implemented method for fine-tuning of a transformer-based language model by extracting terminology terms from a text document, said method comprising:
   identifying a text snippet in a text document;
   identifying candidate multi-word expressions in the identified text snippet using part of speech tags;
   determining a specificity score value for each of the candidate multi-word expressions, wherein the specificity score value is indicative of how unique the candidate multi-word expression is within the text snippet;
   determining a topic similarity score value for each of the candidate multi-word expressions as a distance between an embedding vector corresponding to the identified text snippet and an embedding vector corresponding to the candidate multi-word expression;
   selecting remaining expressions from the candidate multi-word expressions using a function of a specificity value and a topic similarity value of each of the candidate multi-word expressions;
   adding a noun comprised in the text snippet to the remaining expressions depending on a function of a correlation of the noun with a same lemma as one of the remaining expressions and a noun morphology score value of the noun to be added;
   labeling the remaining multi-word expressions; and
   fine-tuning an existing pre-trained transformer-based language model using as training data the identified text snippet marked with the labeled remaining expressions.

2. The method according to claim 1, wherein selecting remaining expressions using a function of the specificity threshold value and a topic similarity value comprises selecting remaining multi-word expressions from the candidate multi-word expressions if the specificity threshold value is greater than a predefined specificity threshold value and if the topic similarity value is greater than a topic similarity threshold value.

3. The method according to claim 1, wherein selecting remaining expressions using a function of the specificity value and a topic value comprises selecting a noun of the identified text snippet if the noun has a score value that is greater than the lowest related multi-word expression score value.

4. The method according to claim 3, wherein the selecting the noun if is score value is greater than the lowest related multi-word expression score value is used as a probabilistic approach to noun selection.

5. The method according to claim 1, wherein the part of speech tags relate to adjectives, followed by nouns or related proper nouns.

6. The method according to claim 1, wherein the specificity score value is determined by using a pre-trained static embedding matrix or by using context dependent embeddings originating from a transformer based-system.

7. The method according to claim 1, wherein the adding a noun comprised in the text snippet to the remaining expressions comprises adding the noun to the remaining expressions only if a number of sub-tokens required for representing the noun is greater than a predefined sub-token threshold value.

8. The method according to claim 1, wherein the using the remaining candidate expressions as training data also comprises adding to the training data manually labeled data.

9. The method according to claim 1, wherein the using the remaining candidate expressions as training data also comprises adding to the training data annotated data from other sources.

10. The method according to claim 1, wherein the pre-trained transformer-based language model is based on Bidirectional Encoder Representations from Transformers or a Generative Pre-trained Transformer.

11. A terminology extraction system for fine-tuning of a transformer-based language model by extracting terminology terms from a text document, the system comprising a processor and a memory, communicatively coupled to the processor, wherein the memory stores program code portions that when executed, enable the processor, to
  identify a text snippet in the text document;
  identify candidate multi-word expressions in the identified text snippet using part of speech tags;
  determine a specificity score value for each of the candidate multi-word expressions, wherein the specificity score value is indicative of how unique the candidate multi-word expression is within the text snippet;
  determine a topic similarity score value for each of the candidate multi-word expressions as a distance between an embedding vector corresponding to the identified text snippet and an embedding vector corresponding to the candidate multi-word expression;
  select remaining expressions from the candidate multi-word expressions using a function of a specificity value and a topic similarity value of each of the candidate multi-word expressions;
  add a noun comprised in the text snippet to the remaining expressions depending on a function of a correlation of the noun with a same lemma as one of the remaining expressions and a noun morphology score value of the noun to be added;
  label the remaining multi-word expressions; and
  fine-tune an existing pre-trained transformer-based language model using as training data the identified text snippet marked with the labeled remaining expressions.

12. The system according to claim 11, wherein the program code instructions enable the processor during the selecting remaining expressions using a function of the specificity threshold value and a topic similarity value also to select remaining multi-word expressions from the candidate multi-word expressions if the specificity threshold value is greater than a predefined specificity threshold value and if the topic similarity value is greater than a topic similarity threshold value.

13. The system according to claim 11, wherein the program code instructions enable the processor during the selecting remaining expressions using a function of the specificity value and a topic value also to select a noun of the identified text snippet if the noun has a score value that is greater than the lowest related multi-word expression score value.

14. The system according to claim 13, wherein the program code instructions enable the processor also to use selection the noun if its score value is greater than the lowest related multi-word expression score value as a probabilistic approach to noun selection.

15. The system according to claim 11, wherein the part of speech tags relate to adjectives, followed by nouns or related proper nouns.

16. The system according to claim 11, wherein the program code instructions enable the processor during the determination the specificity score value also to use a pre-trained static embedding matrix or to use context dependent embeddings originating from a transformer-based system.

17. The system according to claim 11, wherein the program code instructions enable the processor during the adding a noun comprised in the text snippet to the remaining expressions also to add the noun only to the remaining expressions if a number of sub-tokens required for representing the noun is greater than a predefined sub-token threshold.

18. The system according to claim 11, wherein the program code instructions enable the processor during the using the remaining candidate expressions as training data also to add to the training data manually labeled data.

19. The system according to claim 11, wherein the program code instructions enable the processor during the using the remaining candidate expressions as training data also to add to the training data annotated data from other sources.

20. A computer program product for fine-tuning of a transformer-based language model by extracting terminology terms from a text document, the computer program product comprising a computer readable storage medium having program instructions embodied the therewith, the program instructions being executable by one or more computing systems or controllers to cause the one or more computing systems to:
  identify a text snippet in the text document;
  identify candidate multi-word expressions in the identified text snippet using part of speech tags;
  determine a specificity score value for each of the candidate multi-word expressions, wherein the specificity score value is indicative of how unique the candidate multi-word expression is within the text snippet;
  determine a topic similarity score value for each of the candidate multi-word expressions as a distance between an embedding vector corresponding to the identified text snippet and an embedding vector corresponding to the candidate multi-word expression;
  select remaining expressions from the candidate multi-word expressions using a function of a specificity value and a topic similarity value of each of the candidate multi-word expressions;
  add a noun comprised in the text snippet to the remaining expressions depending on a function of a correlation of the noun with a same lemma as one of the remaining expressions and a noun morphology score value of the noun to be added;

label the remaining multi-word expressions; and fine-tune an existing pre-trained transformer-based language model using as training data the identified text snippet marked with the labeled remaining expressions.

* * * * *